(12) United States Patent
Latuszek et al.

(10) Patent No.: US 9,554,625 B2
(45) Date of Patent: Jan. 31, 2017

(54) APPARATUS FOR RATCHETING MULTIPLE RESTRAINT WEBS VIA A SINGLE ACTUATOR

(71) Applicant: Indiana Mills & Manufacturing Inc., Westfield, IN (US)

(72) Inventors: Scott Latuszek, Westfield, IN (US); Kent Bahler, Westfield, IN (US); Guy R. Dingman, Westfield, IN (US)

(73) Assignee: Indiana Mills & Manufacutring, Inc., Westfield, IN (US)

( * ) Notice: Subject to any disclaimer, the term of this patent is extended or adjusted under 35 U.S.C. 154(b) by 0 days.

(21) Appl. No.: 14/783,881

(22) PCT Filed: Apr. 30, 2014

(86) PCT No.: PCT/US2014/036180
§ 371 (c)(1),
(2) Date: Oct. 12, 2015

(87) PCT Pub. No.: WO2014/179468
PCT Pub. Date: Nov. 6, 2014

(65) Prior Publication Data
US 2016/0143400 A1  May 26, 2016

Related U.S. Application Data

(60) Provisional application No. 61/818,138, filed on May 1, 2013.

(51) Int. Cl.
*B60P 7/08* (2006.01)
*A44B 11/12* (2006.01)
(Continued)

(52) U.S. Cl.
CPC ............ *A44B 11/125* (2013.01); *B60P 7/0823* (2013.01); *B60R 22/18* (2013.01); *B60R 22/34* (2013.01);
(Continued)

(58) Field of Classification Search
CPC ...... B60P 7/0823; A44B 11/125; B60R 22/18; B60R 22/347; B60R 22/34; B60R 2022/1806; B60R 2022/3424
(Continued)

(56) References Cited

U.S. PATENT DOCUMENTS

| 4,060,271 A | 11/1977 | Williams |
| 4,265,478 A | 5/1981 | Korsgaard |

(Continued)

FOREIGN PATENT DOCUMENTS

| GB | 2419572 A | 3/2006 |
| NL | 9201844 A | 5/1994 |

OTHER PUBLICATIONS

PCT Search Report and Written Opinion for PCT/US2014/036180, completed Sep. 11, 2014.

*Primary Examiner* — Stephen Gordon
(74) *Attorney, Agent, or Firm* — Barnes & Thornburg LLP

(57) ABSTRACT

An apparatus for ratcheting multiple restraint webs includes first and second locking web retractors each coupled to one end of a different restraint web. When locked, the web retractors each prevent web movement in a web pay-out direction relative thereto. The apparatus further includes first and second ratcheting devices each coupled to a corresponding one of the web retractors, and each is movable in a direction that moves the corresponding web in a web take-up direction relative to its web retractor when the web retractors are locked. The apparatus further includes an actuator movable between two positions and coupled to each of the ratcheting devices. The ratcheting devices are each responsive to a moving force applied thereto by the actuator as the actuator moves between its two positions to move in the (Continued)

direction that moves its corresponding web in the web take-up direction.

18 Claims, 9 Drawing Sheets

(51) Int. Cl.
  *B60R 22/34* (2006.01)
  *B60R 22/347* (2006.01)
  *B60R 22/18* (2006.01)

(52) U.S. Cl.
  CPC ...... *B60R 22/347* (2013.01); *B60R 2022/1806* (2013.01); *B60R 2022/3424* (2013.01)

(58) Field of Classification Search
  USPC ......... 410/7, 9–12, 23, 100, 103; 280/304.1; 296/65.04; 297/DIG. 4
  See application file for complete search history.

(56) References Cited

U.S. PATENT DOCUMENTS

| | | | |
|---|---|---|---|
| 4,842,458 A * | 6/1989 | Carpenter | B60P 7/083 410/103 |
| 4,886,403 A | 12/1989 | Gresham | |
| 5,490,575 A | 2/1996 | Suran et al. | |
| 5,655,619 A | 8/1997 | Suran et al. | |
| 5,709,408 A | 1/1998 | Carraway, Jr. | |
| 5,775,620 A | 7/1998 | Jabusch et al. | |
| 6,113,325 A | 9/2000 | Craft | |
| 6,287,060 B1 * | 9/2001 | Girardin | B60P 7/083 410/11 |
| 6,406,230 B1 | 6/2002 | Mason et al. | |
| 6,428,254 B2 | 8/2002 | Craft | |
| 6,524,039 B1 | 2/2003 | Magnuson et al. | |
| 6,575,677 B2 | 6/2003 | Craft | |
| 6,776,564 B1 | 8/2004 | Kiernan et al. | |
| 6,899,497 B2 | 5/2005 | Cardona et al. | |
| 7,040,847 B1 | 5/2006 | Cardona | |
| 7,452,170 B2 | 11/2008 | Girardin | |
| 7,455,490 B1 | 11/2008 | Goosen | |
| 7,717,655 B2 | 5/2010 | Cardona | |
| 8,141,950 B2 | 3/2012 | Boyer | |
| 8,414,234 B2 | 4/2013 | Girardin et al. | |
| 8,469,401 B2 | 6/2013 | Humbert et al. | |
| 8,672,356 B2 | 3/2014 | Inaguma et al. | |
| 2009/0087278 A1 | 4/2009 | Girardin et al. | |
| 2010/0033001 A1 | 2/2010 | Boyer | |
| 2010/0213753 A1 | 8/2010 | Humbert | |
| 2012/0025588 A1 | 2/2012 | Humbert et al. | |
| 2012/0219395 A1 | 8/2012 | Inaguma et al. | |

* cited by examiner

APPARATUS FOR RATCHETING MULTIPLE RESTRAINT WEBS VIA A SINGLE ACTUATOR

CROSS-REFERENCE TO RELATED APPLICATIONS

This application is a U. S. national phase of International Application No. PCT/US2014/036180, filed Apr. 30, 2014, which claims the benefit of, and priority to, U.S. provisional patent application Ser. No. 61/818,138, filed May 1, 2013, the disclosures of which are expressly incorporated herein by reference.

BACKGROUND

Restraint webs are conventionally used to restrain persons and/or objects in or to motor vehicles of myriad types. In some known applications, a restraint web is attached at one end to a conventional web retractor mounted to a motor vehicle, and is configured at its opposite free end to releasably engage a corresponding coupling structure to thereby restrain the person and/or object in or to the motor vehicle. Such applications may generally include one or more such restraint web/retractor combinations to restrain one or a plurality of persons and/or objects in or to the motor vehicle.

Some conventional web retractors may include a locking mechanism operable in a locked position to prevent movement of the restraint web in at least one web movement direction, e.g., in a pay-out direction and/or in a take-up direction relative to the web retractor. Some such conventional web retractors may further include a ratcheting apparatus, including a ratcheting lever, configured to draw the associated restraint web into the web retractor as the ratcheting lever is actuated. If the free end of the restraint web is engaged with a coupling structure, actuation of the ratcheting lever results in the application of tension to the restraint web.

SUMMARY

The present invention may comprise one or more of the features recited in the attached claims, and/or any one or more combinations thereof. In one aspect, an apparatus for ratcheting multiple restraint webs includes a first web retractor coupled to one end of a first restraint web having an opposite free end. The first web retractor may include a first locking device which, when engaged with the first web retractor, prevents movement of the first restraint web in a web pay-out direction relative to the first web retractor. A second web retractor is coupled to one end of a second restraint web having an opposite free end, and the second web retractor may include a second locking device which, when engaged with the second web retractor, prevents movement of the second restraint web in a web pay-out direction relative to the second web retractor. A first ratcheting device is coupled to the first web retractor, and the first ratcheting device is movable in a direction that moves the first web in a web take-up direction, opposite to the web pay-out direction, relative to the first web retractor when the first locking device is engaged with the first web retractor. A second ratcheting device is coupled to the second web retractor, and the second ratcheting device is movable in a direction that moves the second web in a web take-up direction, opposite to the web pay-out direction, relative to the second web retractor when the second locking device is engaged with the second web retractor. A first actuator is movable between first and second positions and coupled to each of the first and second ratcheting devices. The first and second ratcheting devices are each responsive to a moving force applied thereto by the first actuator, as the first actuator moves from the first position toward the second position thereof, to move in the direction that moves the first and second restraint web respectively in its web take-up direction.

The apparatus may further include a force distribution device coupled to the first actuator and to each of the first and second ratcheting devices. The force distribution device may distribute the moving force applied by the first actuator substantially equally to each of the first and second ratcheting devices as the first actuator is moved from the first position toward the second position.

Alternatively or additionally, the first actuator may comprise a first mounting plate, a first lever coupled to and movable relative to the first mounting plate between the first and second positions of the first actuator, and a clutch coupled to and between the first lever and each of the first and second ratcheting devices. The clutch may be movable with the first lever, as the first lever moves between the first and second positions thereof relative to the first mounting plate, when the moving force applied to the first and second ratcheting devices by movement of the first lever between the first and second positions thereof does not exceed a threshold force. The clutch may allow the first lever to move relative to the clutch such that the clutch remains stationary relative to the first and second ratcheting devices as the first lever moves between the first and second positions thereof when the moving force applied to the first and second ratcheting devices by movement of the first lever relative to the first mounting plate exceeds the threshold force.

Alternatively or additionally still, the apparatus may further include a retractor unlocking apparatus, and a second actuator including a second lever movable between first and second positions and coupled to the retractor unlocking apparatus. The retractor unlocking apparatus may disengage the first locking device from the first web retractor and disengage the second locking device from the second web retractor as the second lever is moved from the first position toward the second position thereof such that the first and second restraint webs are thereafter movable relative to the first and second web retractors respectively in the web pay-out direction.

In another aspect, an apparatus for ratcheting a restraint web includes a web retractor coupled to one end of a restraint web having an opposite free end. The web retractor may include a locking device which, when engaged with the web retractor, prevents movement of the restraint web in a web pay-out direction relative to the web retractor. A ratcheting device is coupled to the web retractor, and the ratcheting device may be movable in a direction that moves the web in a web take-up direction, opposite to the web pay-out direction, relative to the web retractor when the locking device is engaged with the web retractor. A lever is coupled to the ratcheting device and is movably coupled to a mounting plate. The lever may be movable between first and second positions relative to the mounting plate, and the ratcheting device may be responsive to a moving force applied thereto by the lever, as the lever moves from the first position toward the second position thereof, to move in the direction that moves the restraint web in its web take-up direction. A clutch is coupled to the lever and to the ratcheting device, and the clutch is movable with the lever as the lever moves between the first and second positions thereof relative to the mounting plate when the moving force applied to the ratcheting device by movement of the lever between the first and second positions thereof does not exceed a threshold force. The clutch may allow the lever to move relative to the clutch such that the clutch remains stationary relative to the ratcheting device as the lever moves between the first and second positions thereof when the moving force applied to the ratcheting device by movement of the lever relative to the mounting plate exceeds the threshold force.

DETAILED DESCRIPTION OF THE DRAWINGS

Figure 1:
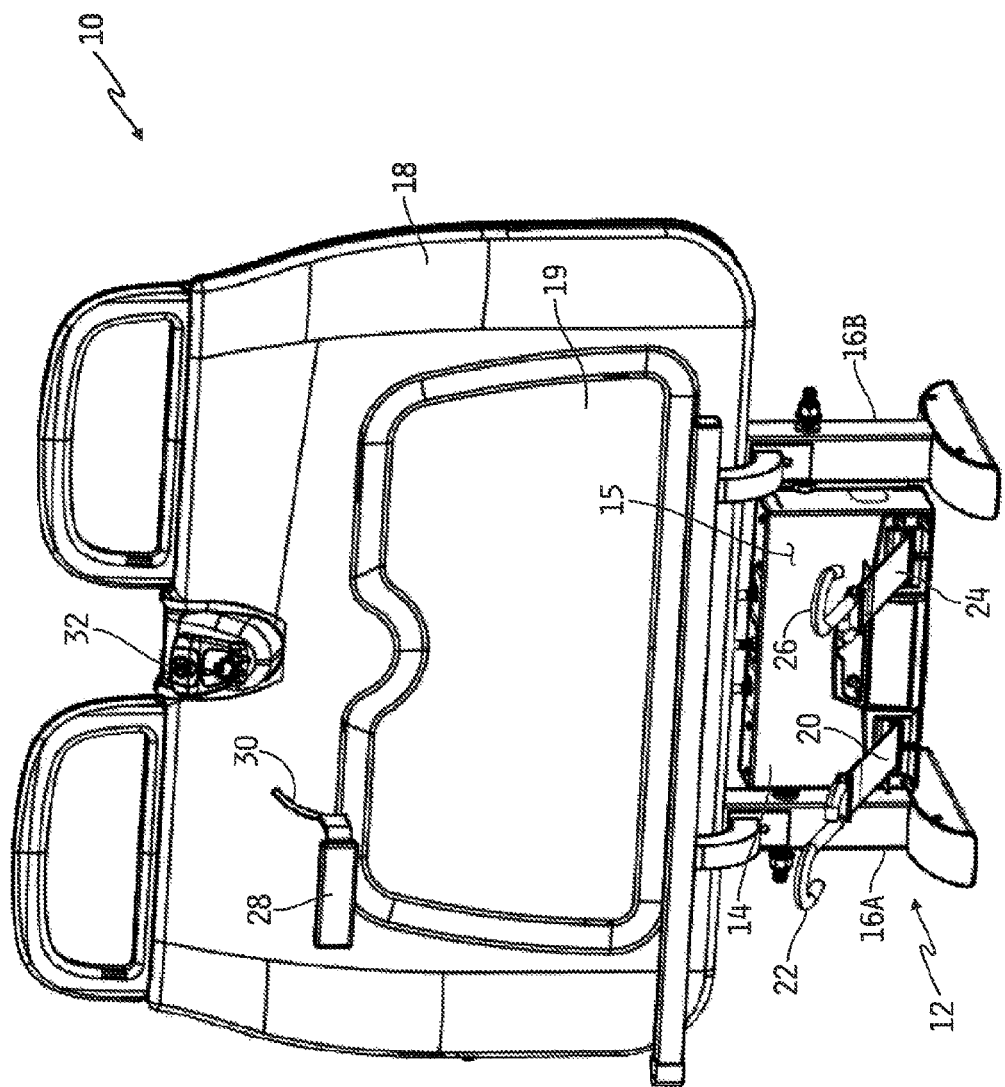
FIG. 1 is a front perspective view of an embodiment of an apparatus for ratcheting multiple restraint webs implemented on a bulkhead for the purpose of restraining a wheelchair in a motor vehicle.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring now to FIG. 1, an embodiment is shown of an apparatus 12 for ratcheting multiple restraint webs using a single mechanical actuator. The apparatus 12 includes a restraint web module 14 which carries multiple web retractors within a housing 15, a web ratcheting actuator including a movable web ratcheting lever 28 and a retractor unlocking apparatus including a retractor unlocking actuator, e.g., including a retractor unlocking lever 32. In the illustrated embodiment, the apparatus 12 is implemented on, i.e., mounted to, a bulkhead 10 for the purpose of restraining a wheelchair in a motor vehicle (not shown), and in this example embodiment the restraint web module 14 is mounted to and between opposing legs 16A and 16B of the bulkhead 10 which may be or include a panel 18 and which may, in some embodiments, additionally include a movable vehicle seat 19 that may be moved, e.g., pivoted, upwardly as illustrated in FIG. 1 to create space between the bulkhead 10 and one or more structures forward of the bulkhead 10, and that may alternatively be moved, e.g., pivoted, downwardly to support one or more passengers in a seated position. The panel 18 illustratively defines a slot 30 through which the web ratcheting lever 28 extends, and the retractor unlocking lever 32 is illustratively mounted to the panel 18 centrally along a top edge thereof.

Figure 11:
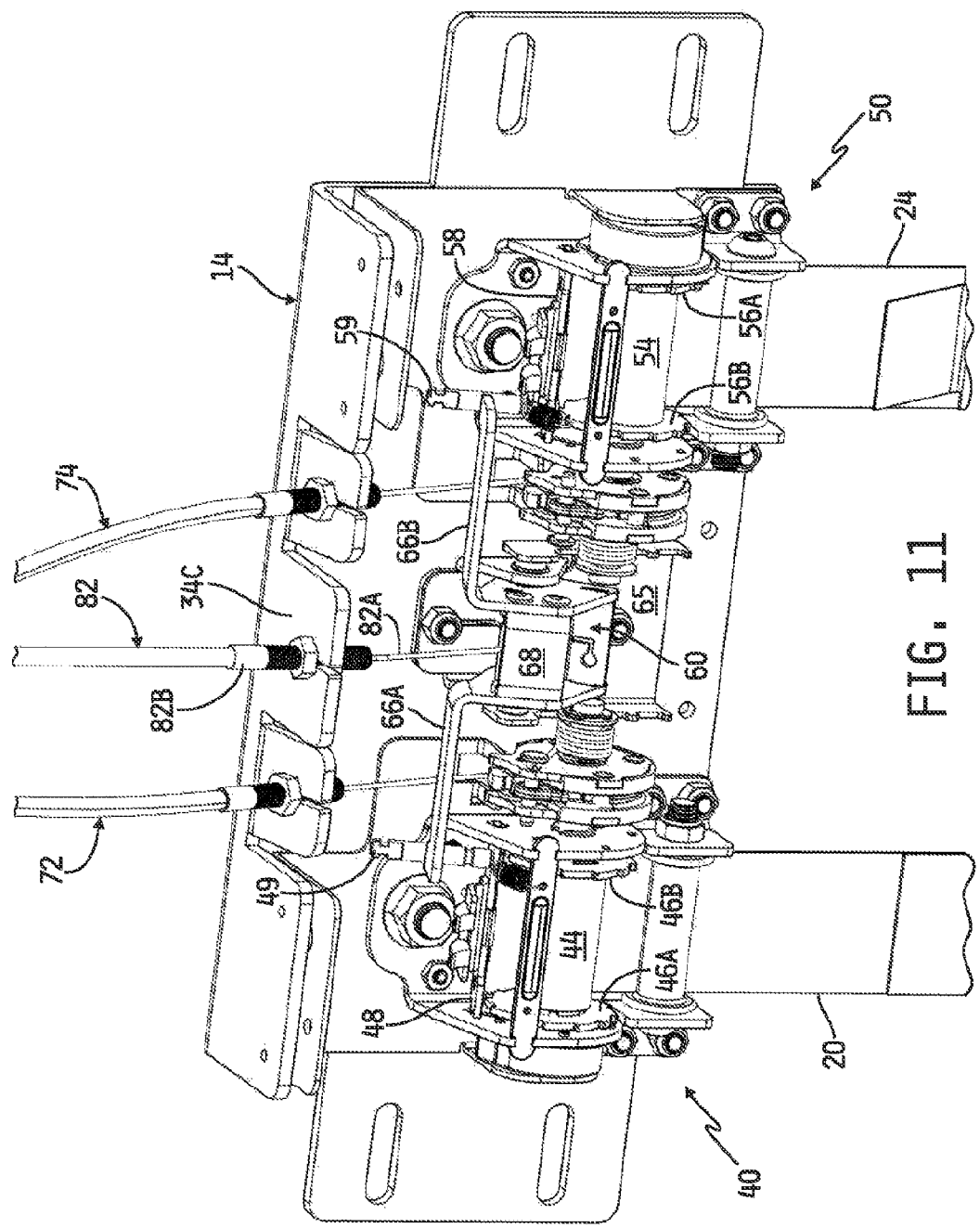
FIG. 11 is a front perspective view similar to FIG. 3 illustrating operation of the retractor unlocking apparatus when the web unlocking actuator illustrated in FIGS. 1 and 2 is actuated to thereby allow the restraint webs to move in a web pay-out direction relative to their respective web retractors.

In the embodiment illustrated and described herein, the apparatus 12 includes two web retractors (see, e.g., FIGS. 2, 3 and 11) each coupled to one end of a different restraint web 20, 24, and the free end of each web 20, 24 is illustratively coupled to a conventional attachment structure 22, 26 respectively, e.g., a hook or similar structure for releasably engaging an object to be restrained, e.g., a conventional wheelchair. It will be appreciated, however, that the concepts illustrated and described herein may alternatively be implemented in any application in which it is desirable to substantially simultaneously retract two or more restraint webs and/or to substantially simultaneously apply tension to more than two restraint webs releasably attached to one or more structures using a single, manually operable actuator, and in any such application the free ends of the restraint webs may be outfitted with any known structure for releasably engaging or attaching to one or more coupling structures. Examples of such structures for releasably engaging or attaching to one or more coupling structures include, but should not be limited to, hooks, e.g., J-hooks, S-hooks or the like, conventional seat belt engagement tongues or buckles, carabiners, clamps, posts, hitches or the like.

As will be described in greater detail hereinafter, the apparatus 12 further includes a plurality of ratcheting devices each coupled to and between the web ratcheting actuator and a different one of the plurality of web retractors carried by the restraint web module 14. The web retractors each include a locking device which, when engaged with the associated web retractor, i.e., when the web retractor is locked, prevents movement of the associated restraint web in a web pay-out direction relative to the web retractor, i.e., in a direction in which the restraint web is being drawn out and away from the web retractor. With the locking devices engaged, the web ratcheting actuator can be moved between two actuator positions to apply a moving force which causes each of the ratcheting devices to simultaneously move in a direction that moves the plurality of restraint webs in a web take-up direction opposite to the web pay-out direction, i.e., in a direction that moves or draws the plurality of restraint webs into corresponding ones of the plurality of web retractors. If the attachment structure(s) 22 and/or 26 is/are coupled to one or more objects to be restrained, e.g., a wheelchair, with the web retractors locked as just described, movement of the web ratcheting actuator between the two actuator positions applies a moving force which applies tension to, and/or increases tension applied to, the corresponding web 20 and/or 24 as will be described in greater detail hereinafter. In some embodiments, the apparatus 12 further includes a force distribution device which operates to distribute the moving force applied by the web ratcheting actuator substantially equally to each of the plurality of ratcheting devices as the web ratcheting actuator is moved between the two actuator positions. The apparatus 12 further illustratively includes a retractor unlocking apparatus which operates to substantially simultaneously disengage each of the locking devices from its associated web retractor when the web unlocking actuator is actuated such that each of the plurality of restraint webs is thereafter movable relative to its associated web retractor in the web pay-out direction.

Figure 2:
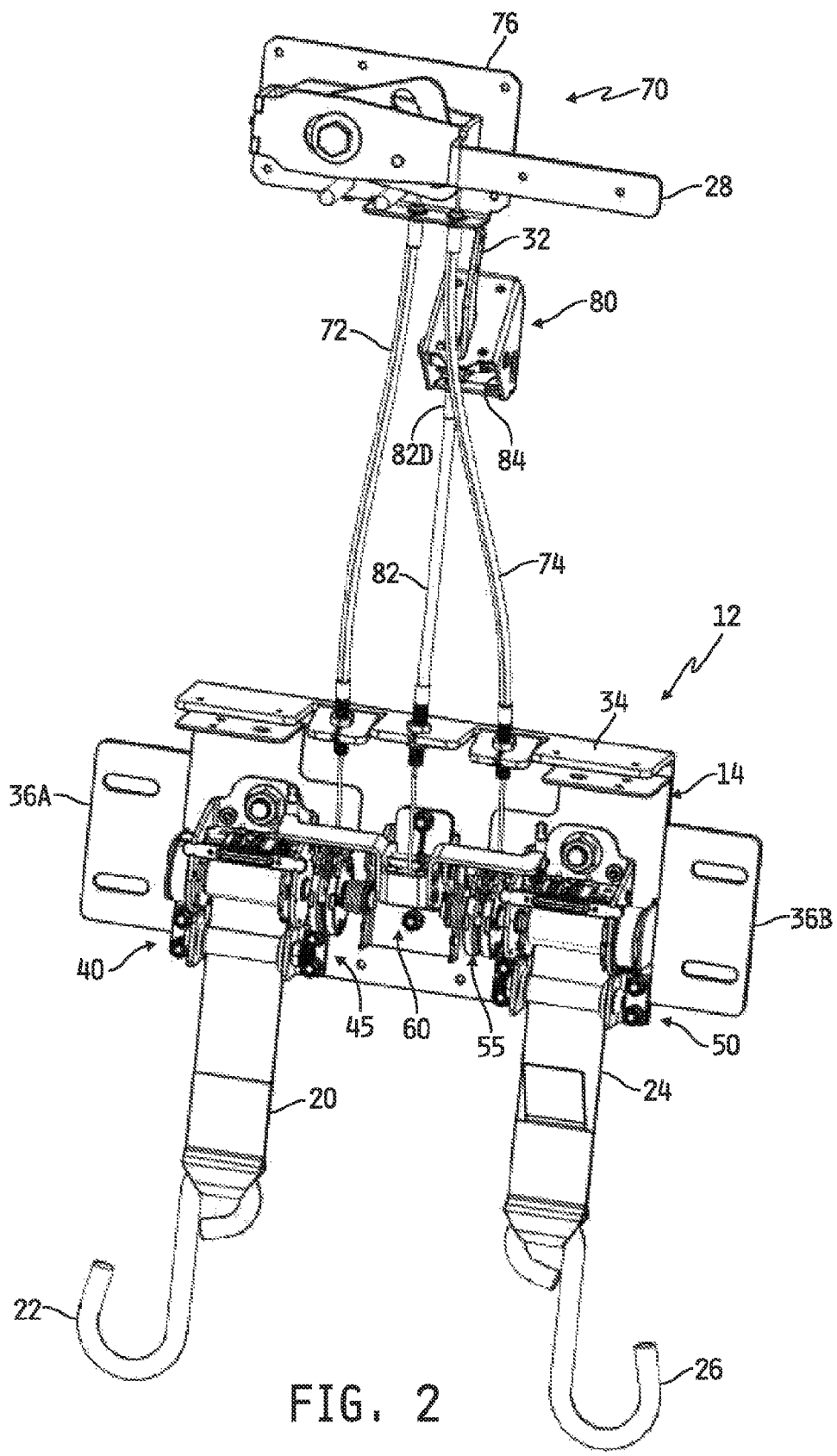
FIG. 2 is a front perspective view similar to FIG. 1 but with the bulkhead and front cover of the restraint web module omitted for clarity of illustration of various components of the apparatus.

Referring now to FIG. 2, the apparatus 12 is shown with the bulkhead 10 omitted and with the housing 15 removed from the restraint web module 14 to illustrate various components housed therein. In the illustrated embodiment, the module 14 includes a frame 34 defining mounting ears or tabs 36A, 36B at opposite sides thereof, and the frame 34 is mountable to the legs 16A, 16B by passing conventional fixation elements through one or more of the slots defined through the ears 36A, 36B and into corresponding bores or slots defined in the legs 16A, 16B respectively. Two web retractors 40, 50 are mounted to the frame 34 and are illustratively spaced apart from each other as shown. A ratcheting device 45 is mounted to the web retractor 40, and another ratcheting device 55 is mounted to the web retractor 50. The web retractors 40, 50 are illustratively identical except that they are mirror images of each other about a vertical plane bisecting the frame 34. The ratcheting devices 45, 55 are likewise illustratively identical except that they are mirror images of each other about the vertical plane bisecting the frame 34. Those skilled in the art will recognize, however, that the web retractors 40, 50 need not be identical, nor do the ratcheting devices. In any case, a retractor unlocking apparatus 60 is mounted to the frame 34, and in the illustrated embodiment the retractor unlocking apparatus 60 is positioned generally between the two web retractors 40, 50, and more specifically between the two ratcheting devices 45, 55.

The apparatus 12 further includes a web ratcheting actuator 70, which includes the web actuating lever 28 movably mounted to a web ratcheting actuator bracket 76. The web ratcheting actuator 70 is operatively coupled to the web ratcheting device 45 via a conventional cable 72, and is operatively coupled to the web ratcheting device 55 via another conventional cable 74. In the embodiment illustrated and described herein, the cables 72, 74 are provided as a single cable having one end coupled to the web ratcheting device 45 and an opposite end coupled to the web ratcheting device 55, and engaged with the web ratcheting actuator 70 between the two ends. In alternative embodiments, the cables 72, 74 may be separate cables with the cable 72 connected to and between the web ratcheting device 45 and the web ratcheting actuator 70 and with the cable 74 connected to and between the web ratcheting device 55 and the web ratcheting actuator 70. In any case, the web ratcheting actuator 70 is configured to operate the web ratcheting devices 45, 55 via the cables 72, 74 by movement of the web actuator lever 28 as will be described in detail below. In the embodiment illustrated in FIG. 1, the web ratcheting actuator bracket 76 is mounted to the bulkhead 10 with the web actuating lever 28 accessible through the bulkhead 10 as shown.

The apparatus 12 further includes a web unlocking actuator 80, which includes the retractor unlocking lever 32 illustrated in FIG. 1. The retractor unlocking lever 32 is movably mounted to a retractor unlocking bracket 84 and is operatively coupled to the web retractor unlocking apparatus 60 via a another conventional cable 82. In the embodiment illustrated and described herein, the cable 82 is identical to the cable(s) 72, 74 and the web unlocking actuator 80 is configured to operate the web unlocking apparatus 60 via the cable 82 by movement of the retractor unlocking lever 32 relative to the retractor unlocking bracket 84 as will be described in detail below. In the embodiment illustrated in FIG. 1, the retractor unlocking bracket 84 is mounted to the bulkhead 10 with the retractor unlocking lever 32 accessible through the bulkhead 10 as shown.

Figure 3:
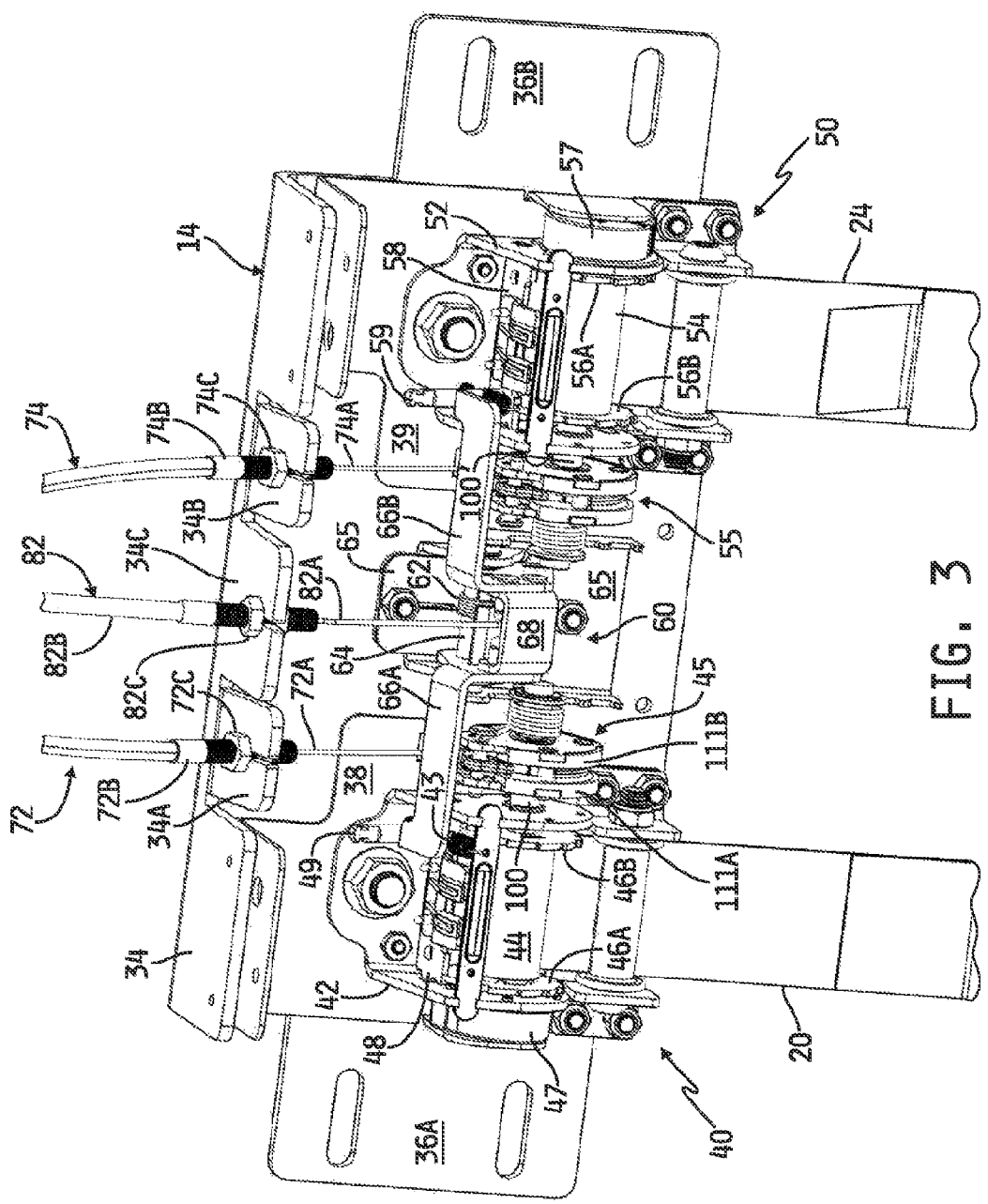
FIG. 3 is a magnified view of the restraint web module of FIG. 2 illustrating various components of thereof.

Referring now to FIG. 3, a magnified view of the module 14 is shown with the housing 15 removed to illustrate various components mounted within and to the frame 34. In the illustrated embodiment, for example, a mounting plate 38 is mounted to the frame 34 and the web retractor 40 includes a frame 42 having a base that is mounted to the mounting plate 38 and two spaced-apart sidewalls that extend upwardly from the base. An axle 100 is rotatably mounted to and through the two sidewalls of the retractor frame 42 such that the axle 100 is rotatable relative to the frame 42 about a longitudinal axis defined centrally through the axle 100. A spool 44 is mounted on and to the axle 100 between the two sidewalls of the frame 42 such that the spool 44 rotates with the axle 100 about the axis of the axle 100. In the illustrated embodiment, the web retractor 40 includes two ratchet wheels 46A, 46B each mounted to the spool 44 at opposite ends thereof such that the ratchet wheels 46A, 46B rotate with the spool 44 about the axis of the axle 100. In alternate embodiments, the web retractor 40 may include more or fewer such ratchet wheels 46. In any case, each such ratchet wheel 46A, 46B defines a plurality of teeth, T1, about its periphery (see FIG. 5). One end of the restraint web 20 is attached to the spool 44, and the length of the spool 44 and the width of the restraint web 20 are sized such that the restraint web 20 can be wound around the spool 44.

The web retractor 40 further includes a main spring 47 mounted to an outer surface of one of the sidewalls of the frame 42, and the axle 100 extends through the sidewall of the frame 42 and into engagement with the mainspring 47 in a conventional manner. The mainspring 47 normally biases the axle 100, and thus the spool 44, for rotation in a web take-up direction; that is, in a direction in which the restraint web 20 is wound upon, and therefore taken up by, the spool 44.

The web retractor 40 further includes a locking device which, when engaged with the web retractor 40, prevents movement of the restraint web 20 relative to the web retractor 40 in a web pay-out direction that is opposite to the web take-up direction. In the illustrated embodiment, for example, the locking device, when engaged with the web retractor 40, i.e., when in a locked position, prevents rotation of the spool 44 in a direction in which the restraint web 20 is paid out from the spool 44. In one embodiment, the locking device of the web retractor 40 is provided in the form of a locking bar 48 which is illustratively an elongated, planar bar having one end movably, e.g., pivotably, mounted to one of the sidewalls of the frame 42 and an opposite end movably, e.g., pivotably, mounted to the other sidewall of the frame 42 adjacent to the ratchet wheels 46A, 46B. The locking bar 48 is illustratively movable, e.g., pivotable, relative to the sidewalls of the frame 42 between two positions; namely, a locked position in which the locking bar 48 is trapped between one of the teeth, T1, of each ratchet wheel 46A, 46B and the sidewalls of the frame 42 (see, e.g., FIG. 4 with respect to the locking bar 58 of the web retractor 50), and an unlocked position in which the locking bar 48 is away from and not in contact with either ratchet wheel 46A, 46B. Illustratively, the teeth, T1, of each ratchet wheel 46A, 46B are shaped and oriented relative to the respective ratchet wheel 46A, 46B such that, in the locked position, the locking bar 48 engages the ratchet wheels 46A, 46B adjacent to a flat side of one of the teeth, T1, and the flat side of the tooth, T1, prevents the ratchet wheels 46A, 46B, and thus the spool 44, from rotating in the web pay-out direction. The opposite side of each of the teeth, T1, in contrast, is curved, and this curved side allows the locking bar 48 to pass over the teeth, T1, when the spool 44 is rotating in the web take-up direction with the locking bar 48 in its locked position.

In the illustrated embodiment, a post 49 is mounted to and extends upwardly from the locking bar 48. A biasing member 43, e.g., a coiled spring, is attached to and between the frame 42 and the post 49, and the biasing member 43 exerts a biasing force on the locking bar 48 relative to the frame 42 which normally biases, or draws, the locking bar 48 to its locked position described above. The locking bar 48 is movable to its unlocked position, as will be described in detail below, by applying a force greater than that of the biasing force of the biasing member 43 to the post in a direction opposite to that of the biasing member 43. In alternative embodiments, the post 49 may be omitted, the biasing member 43 may be mounted directly between the frame 42 and the locking bar 48 and moving the locking bar 48 to its unlocked position may be accomplished using one or more conventional structures that interact directly or indirectly with the locking bar 48.

Further in the illustrated embodiment, another mounting plate 39 is mounted to the frame 34 and is spaced apart from the mounting plate 38. The web retractor 50 includes a frame 52 having a base that is mounted to the mounting plate 39 and two spaced-apart sidewalls that extend upwardly from the base. As with the web retractor 40, an axle 100' is rotatably mounted to and through the two sidewalls of the retractor frame 52 such that the axle 100' is rotatable relative to the frame 52 about a longitudinal axis defined centrally through the axle 100'. The remaining features of the web retractor 50 are identical in structure and operation to those just described with respect to the web retractor 40. In particular, the features of the web retractor 40 identified with a 4X reference character are identified in relation to the web retractor 50 in FIG. 3 with a corresponding 5X reference character, and because such features are otherwise identical in structure and operation to those just described with respect to the web retractor 40 a detailed description of such features of the web retractor 50 will not be duplicated here.

Further in FIG. 3, the web retractor unlocking apparatus 60 includes a frame 65 having a base mounted to the frame 34 between the web retractors 40 and 50. The two spaced-apart sidewalls extend upwardly from the base of the frame 65, and an axle 64 is rotatably mounted to and through the two sidewalls of the frame 65 such that the axle 64 is rotatable relative to the frame 65 about a longitudinal axis defined centrally through the axle 64. One unlocking bar 66A is mounted to the axle 64 adjacent to one of the sidewalls of the frame 65, and another unlocking bar 66B is mounted to the axle 64 adjacent to the other sidewall, and the unlocking bars 66A, 66B are both rotatable with the axle 65, relative to the sidewalls of the frame 65, about the axis of the axle 64. A bracket 68 is mounted to and between each of the unlocking bars 66A, 66B, and one end of the cable 82 is mounted to the bracket 68.

Figure 4:
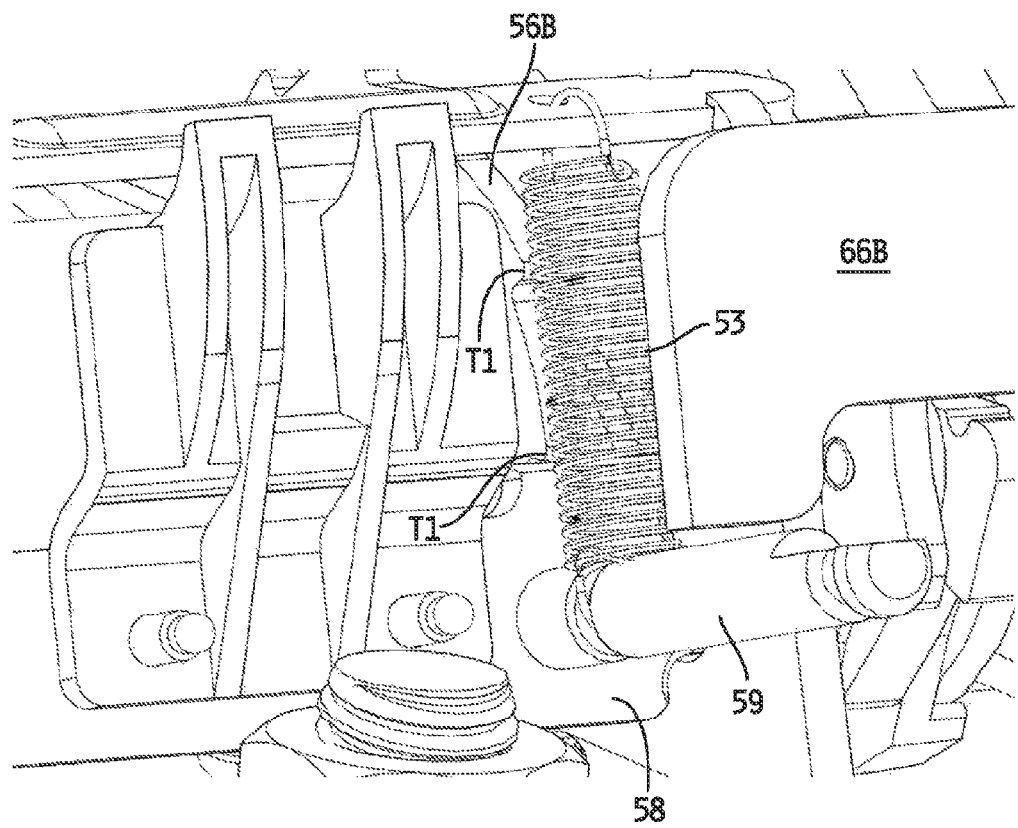
FIG. 4 is a magnified top perspective view of a portion of the restraint web module of FIGS. 2 and 3 illustrating an example locking device which prevents movement of one of the restraint webs in a web pay-out direction relative to the illustrated web retractor as long as the web unlocking actuator illustrated in FIGS. 1 and 2 is in its non-actuated position.

A biasing member 62, e.g., a coiled spring, is slidably received on the axle 64 and is attached to and between the frame 65 and the bracket 68 of the web retractor unlocking apparatus 60. The biasing member 62 exerts a biasing force on the bracket 68 relative to the frame 42 which, when the retractor unlocking lever 32 is in an unactuated position, normally biases the combination of the bracket 58 and the unlocking bars 66A, 66B to a rest position, as illustrated in FIG. 3, in which the free ends of the locking bars 66A, 66B are away from and not in contact with the posts 49, 59 attached to the locking bars 48, 58 of the web retractors 40, 50 respectively, as illustrated in FIG. 4 with respect to the unlocking bar 66B and the post 59. In alternate embodiments, the free ends of the unlocking bars 66A, 66B may be in contact with the posts 49, 59 respectively when the combination of the bracket 58 and the unlocking bars 66A, 66B is in its rest position, as long as the unlocking bars 66A, 66B do not exert a force on the posts 49, 59 sufficient to move the locking bars 48, 58 to their unlocked positions. In any case, the combination of the bracket 58 and the unlocking bars 66A, 66B is movable from its rest position to an unlocking position, illustrated in FIG. 11, by moving the retractor unlocking lever 32 from its unactuated or rest position toward its actuated position. This moving force applied to the retractor unlocking lever 32 is transferred to the combination of the bracket 58 and the unlocking bars 66A, 66B via the cable 82, and movement of the combination of the bracket 58 and the unlocking bars 66A, 66B toward its unlocking position draws the free ends of the unlocking bars, substantially simultaneously, into contact with the posts 49, 59 respectively and overcomes the biasing force of the biasing members 43, 53 to move the locking bars 48, 58 to their unlocked positions. With the locking bars 48, 58 in their unlocked positions, the spools 44, 54, and thus the restraint webs, 20, 24, are movable in the web pay-out and take-up directions.

Figure 8:
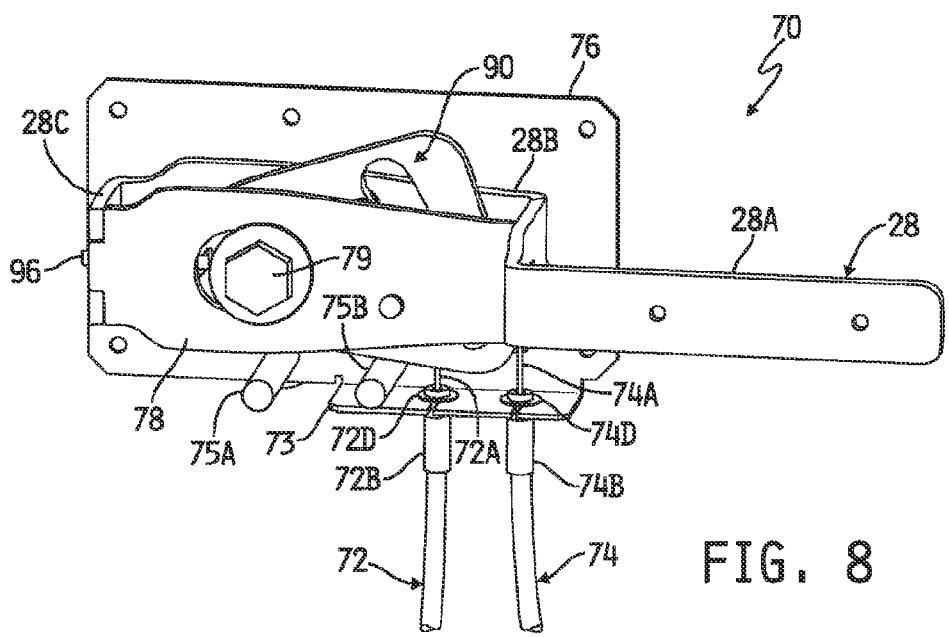
FIG. 8 is a front perspective view of the web ratcheting actuator of FIGS. 1 and 2, shown in its non-actuated position.
Figure 9:
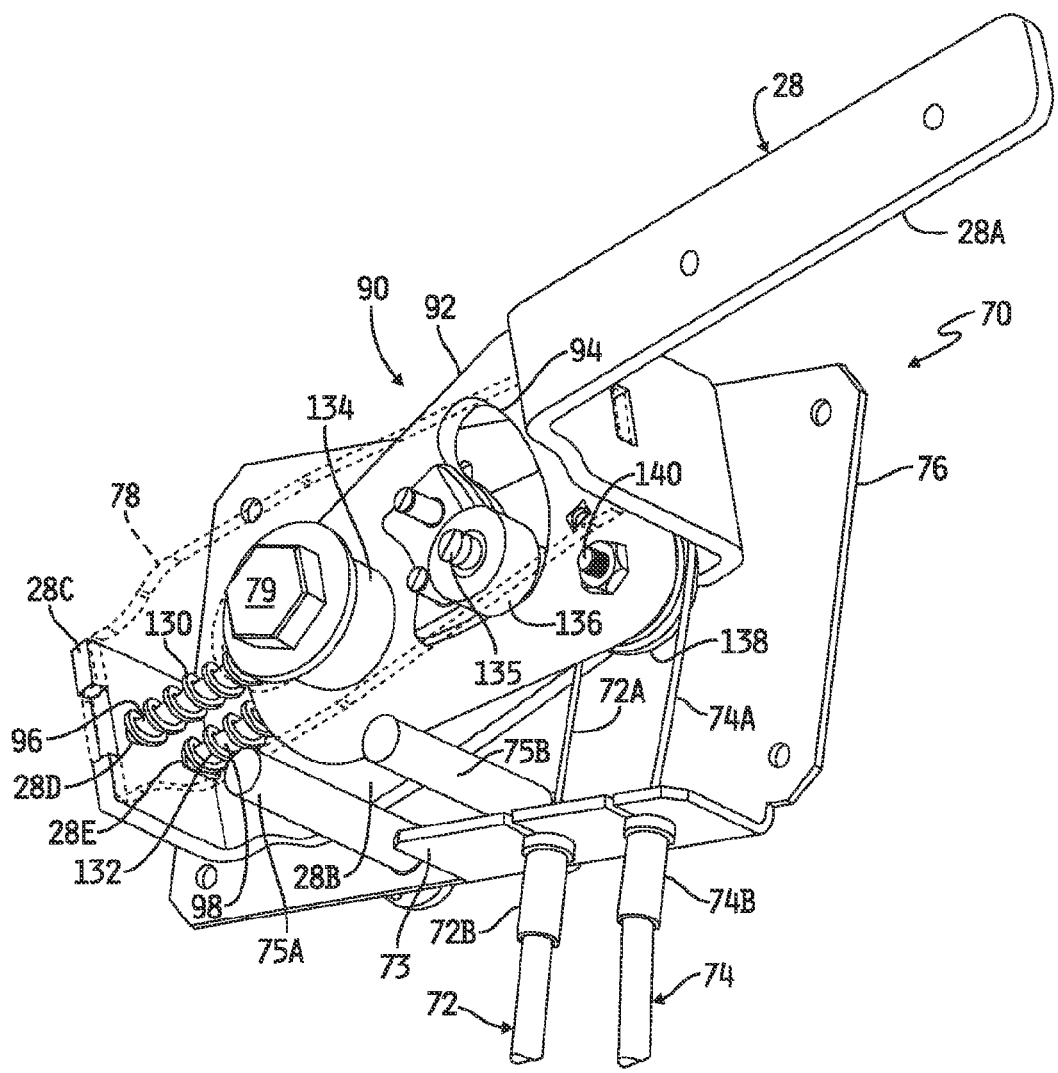
FIG. 9 is a front perspective view of the web ratcheting actuator of FIGS. 1, 2 and 8 shown being actuated between its non-actuated and fully actuated positions when the moving force applied to the ratcheting devices by movement of the web ratcheting lever relative to the mounting plate does not exceed a threshold force.
Figure 10:
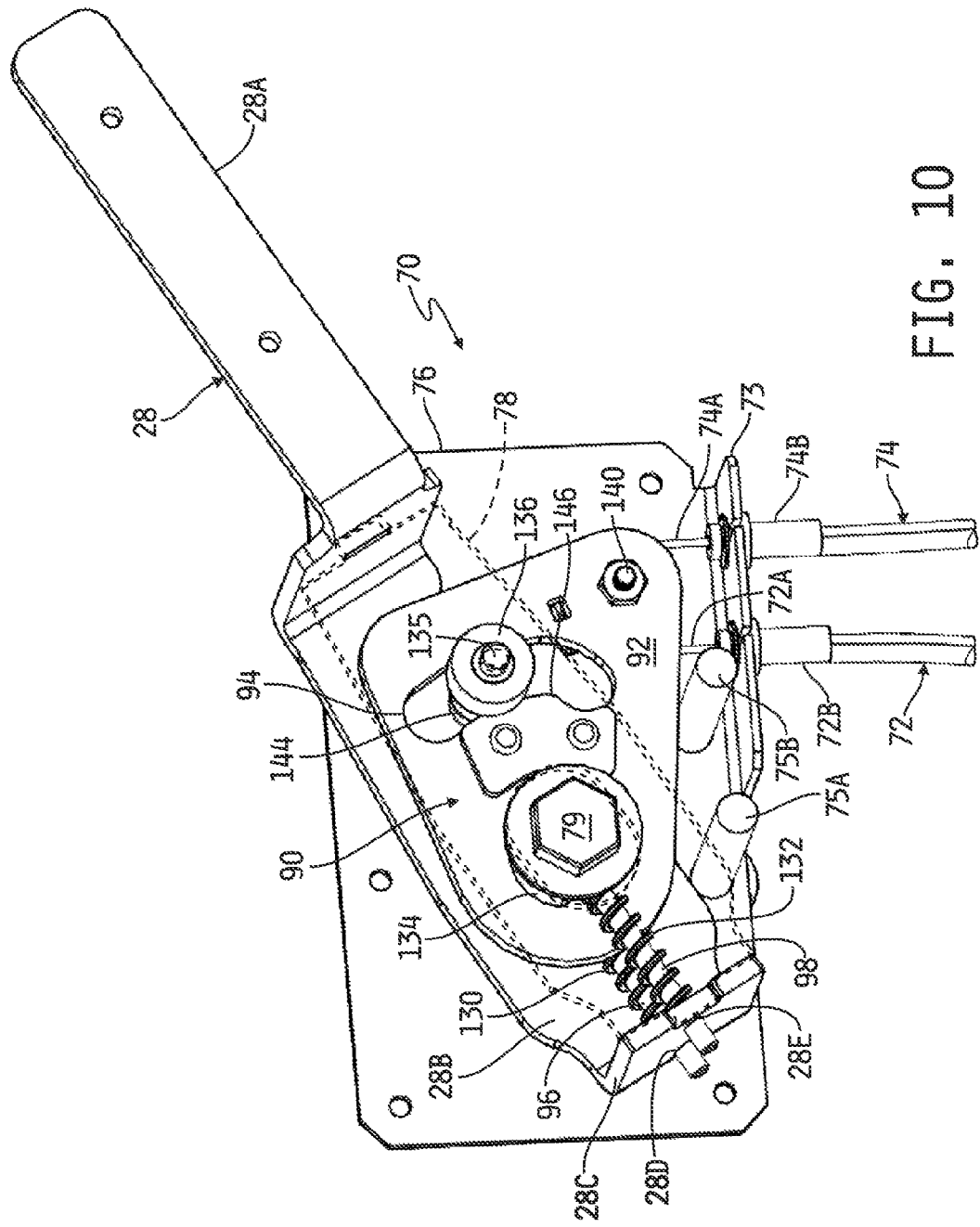
FIG. 10 is a front perspective view of the web ratcheting actuator of FIGS. 1, 2, 8 and 9, illustrating movement of the web ratcheting lever relative to the clutch of the web ratcheting actuator when the moving force applied to the ratcheting devices by movement of the web ratcheting lever relative to the mounting plate exceeds the threshold force.

In one embodiment, the cables 72, 74 and 82 are each illustratively implemented in the form of a conventional cable wire carried within an outer cable sheath, wherein the outer cable sheath is generally stationary in its attached position and the cable wire is longitudinally movable relative to the outer cable sheath. In the illustrated embodiment, for example, the cable 72 includes a cable wire 72A connected at one end to the ratcheting device 45 and an outer cable sheath 72B mounted at one end 72C to a portion 34A of the frame 34, the cable 74 includes a cable wire 74A connected at one end to the ratcheting device 55 and an outer cable sheath 74B mounted at one end 74C to another portion 34C of the frame 34, and the cable 82 includes a cable wire 82A connected at one end to the retractor unlocking apparatus 60 and an outer cable sheath 82B mounted at one end 82C to yet another portion 34C of the frame 34. As illustrated in FIGS. 8-10, the opposite end 72D of the cable sheath 72B is mounted to a portion 73 of a mounting plate 76 of the web ratcheting actuator 70, and the opposite end 74D of the cable sheath 74B is also mounted to the portion 73 of the mounting frame 76. As also illustrated in FIGS.

8-10, the opposite ends of the cable wires 72A, 74A are integral such that the cable wires 72A, 74A are formed of a single, unitary cable wire. In alternate embodiments, the cable wires 72A, 74A may be separate wires. In any case, the opposite end 82D of the cable sheath 82B is mounted to the retractor unlocking bracket 84 and the opposite end of the cable wire 82A is mounted to the web retractor unlocking handle 32 (see FIG. 1). It will be understood that the foregoing implementation of the cables 72, 74 and 82 is merely illustrative, and that other conventional cable types may alternative be used for any one or more of the cables 72, 74 and 82.

Figure 5:
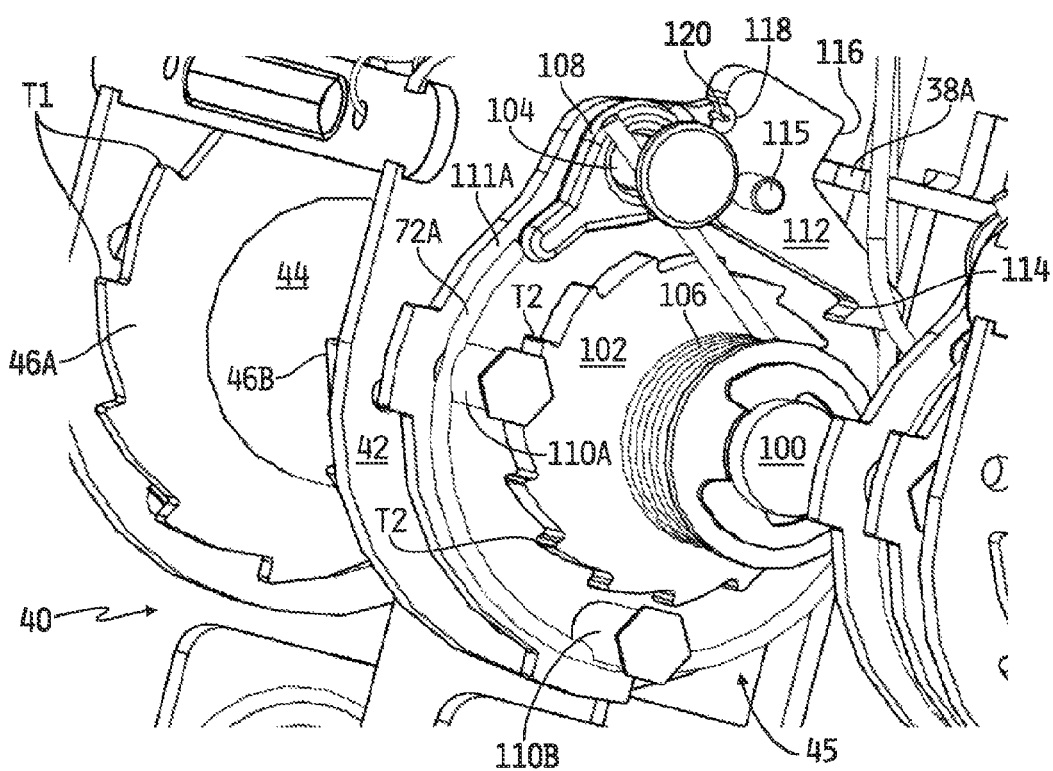
FIG. 5 is a magnified front perspective view of a portion of the restraint web module of FIGS. 2 and 3 illustrating an embodiment of one of the ratcheting devices shown in a position in which the web ratcheting actuator is in its non-actuated state, and also shown with its outer ratcheting device plate and the web retractor unlocking apparatus omitted for clarity of illustration.
Figure 6:
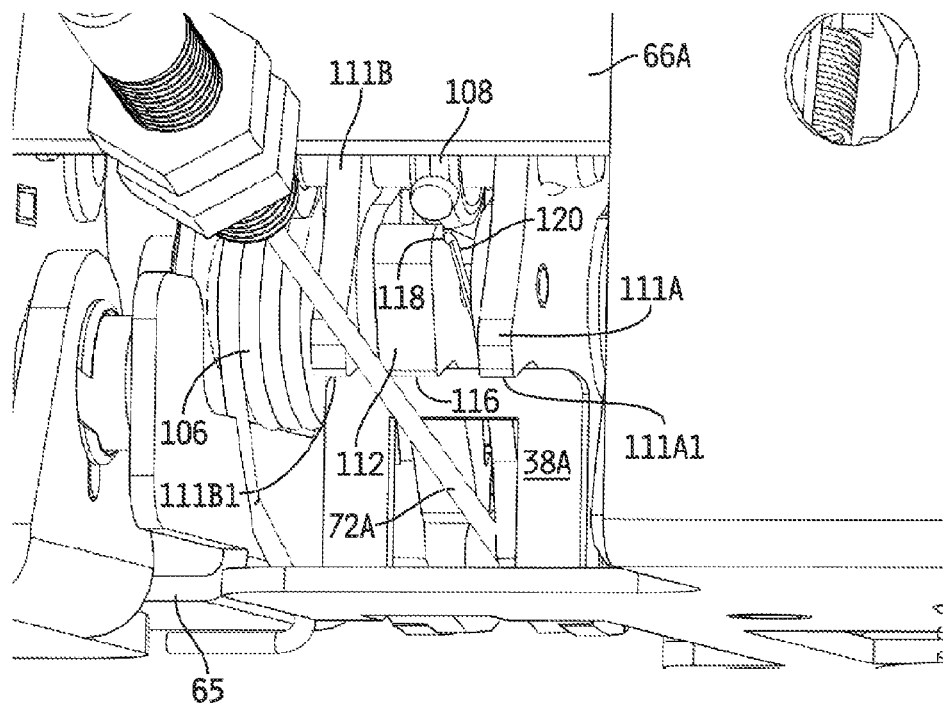
FIG. 6 is a magnified top perspective view of the ratcheting device of FIG. 5 including its outer ratcheting device plate and illustrating further details relating to the structure and operation of the ratchet gear engagement pawl.
Figure 7:
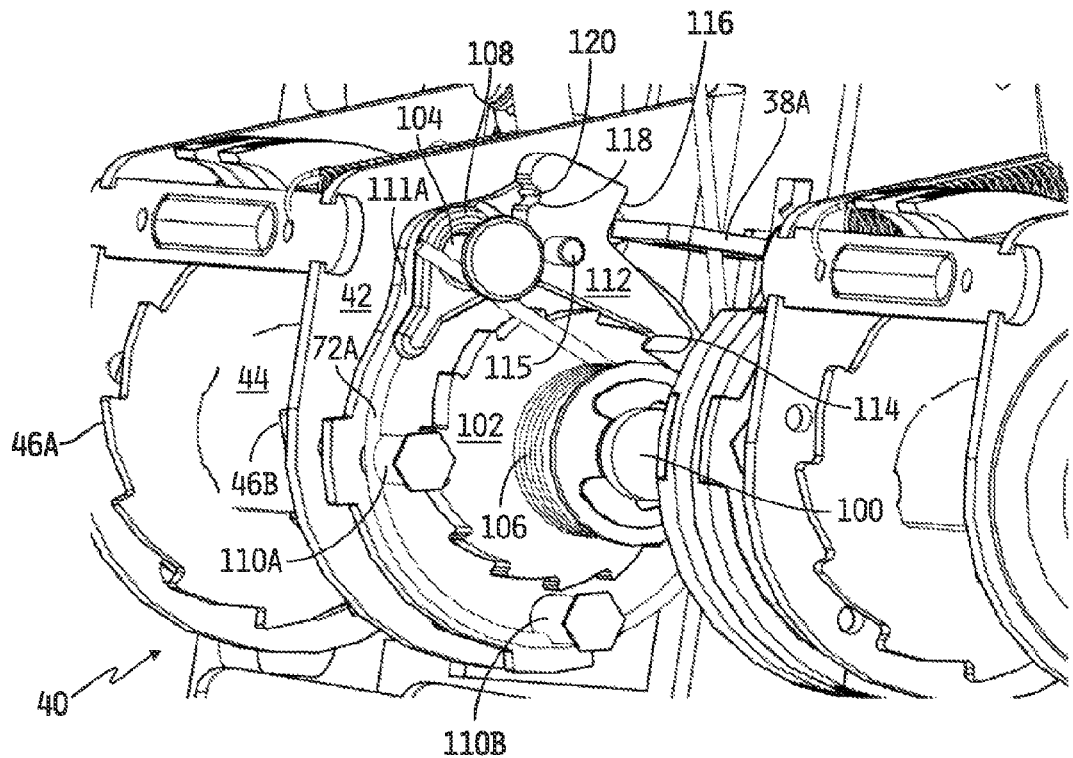
FIG. 7 is a magnified front perspective view similar to FIG. 5 showing movement of the ratcheting device as the web ratcheting actuator is actuated.

Referring now to FIGS. 5-7, various details of the ratcheting device 45 associated with the web retractor 40 are shown. It will be understood that the following description of the structure and operation of the ratcheting device 45 applies also to the ratcheting device 55 of the web retractor 50. As best illustrated in FIGS. 5 and 7, the end of the axle 100 of the web retractor 40 opposite to the end that engages the mainspring 47 extends beyond the corresponding sidewall of the frame 42, and the ratcheting device 45 is mounted on the axle 100 adjacent to an exterior surface of the sidewall of the frame 42. A toothed wheel 102 is mounted on and to the axle 100 such that the toothed wheel 102 rotates with the axle 100 about the axis of the axle 100, and the toothed wheel 102 defines a plurality of teeth, T2, about its periphery. A ratchet plate 111A is mounted on the axle 100, e.g., between the toothed wheel 102 and the sidewall of the frame 42, such that the ratchet plate 111A is rotatable about and relative to the axle 100 and also relative to the sidewall of the frame 42. A fixation element 104, e.g., a pin, post or bolt, extends away from an outer surface of the ratchet plate 111A, and one end of the cable wire 72A is affixed to the fixation element 104 via an attachment member 108, e.g., a clip or eyelet. A number of additional fixation elements, e.g., three pins, posts or bolts 110A, 110B, 110C, extend away from the outer surface of the ratchet plate 111A adjacent to and at least partially about its periphery, and these additional fixation elements act to support the cable wire 72A and guide rotation of the ratchet plate 111A about the axle 100 in response to movement of the cable wire 72A.

The ratcheting device 45 further includes a pawl 112 movably, e.g., pivotably, mounted to the ratchet plate 111A via a pin 115 or axle 100. A front surface of one end of the pawl 112 defines a tooth 114 that is sized and configured to engage any of the teeth, T2, defined about the periphery of the toothed wheel 102, and the front surface of an opposite end of the pawl 112 defines a notch or channel 118 sized and configured to receive one end of another biasing member 120, e.g., a coiled spring. An opposite end of the biasing member 120 is coupled to the ratchet plate 111A. Omitted from FIGS. 5 and 7 but shown in FIGS. 3 and 6 is another ratchet plate 111B that is mounted on the axle 100, e.g., with the toothed wheel 102 positioned between ratchet plates 111A, 111B, such that the ratchet plate 111B is rotatable about and relative to the axle 100 and also relative to the sidewall of the frame 42. The fixation elements 104, 110A, 110B and 110C further act to secure together the ratchet plates 111A and 111B such that the ratchet plates 111A, 111B rotate together about and relative to the axle 100 and also relative to the frame 42 of the web retractor 40. Between the two ends of the pawl 112, a back surface of the pawl 112 defines a frame engaging surface 116 that is sized and configured to engage a portion 38A of the frame 38 to which the web retractor 40 is mounted. As best illustrated in FIG. 6, the ratchet plates 111A and 111B likewise define frame engaging surfaces 111A1 and 111B1 respectively, which are sized and configured to engage the portion 38A of the frame 38 on either side of the frame engaging surface 116 of the pawl 112.

A biasing member 106, e.g., a coiled spring, is slidably received on the axle 100 and is attached to and between the fixation element 108 and the frame 34, e.g., the frame 65 of the web retractor unlocking apparatus 60 which is affixed to the frame 34 (see FIG. 6). The biasing member 106 exerts a biasing force on the ratchet plates 111A, 111B relative to the frame 34 which, when the web ratcheting lever 28 is in an unactuated or rest position such that it is not applying a moving force to the cable wire 72A, normally biases the ratchet plates 111A, 111B to a rest position, as illustrated in FIGS. 5 and 6, in which the frame engaging surfaces 111A1, 111B1 of the ratchet plates 111A, 111B are forced into engagement with the portion 38A of the frame 38. The biasing member 120 extending between the notch or channel 118 of the pawl 112 exerts a biasing force against the top portion of the pawl 112 which normally causes the pawl 112 to rotate about the pin 115 and force the tooth 114 toward and into engagement with the toothed wheel 102. However, when the web ratcheting lever 28 is in an unactuated or rest position, the force of the biasing member 106 acting against the ratchets plates 111A, 111B forces the frame engaging surface 116 of the pawl 112 into engagement with the portion 38A of the frame 38. The biasing force of the biasing member 106 is generally greater than that of the biasing member 120, and the resulting force of the portion 38A of the frame 38 acting on the frame engaging surface 116 of the pawl 112 causes the pawl 112 to rotate about the pin and force the tooth 114 away from and out of engagement with the toothed wheel 102 as illustrated in FIGS. 5 and 6. With the ratchet plates 111A, 111B in their rest position and the tooth 114 of the pawl 112 biased by the biasing member 106 away from the toothed wheel 102, the toothed wheel 102 rotates with the spool 44 about the axle 100.

When a moving force is applied to the web ratcheting lever 28 in its rest position, as will be described in detail below, this moving force is transferred via the cable wire 72A and the fixation element 104 to the ratchet plates 111A, 111B, and overcomes the biasing force of the biasing member 106 to cause the ratchet plates 111A, 111B to rotate in the web take-up direction relative to the frame 42 of the web retractor 40 as illustrated in FIG. 7. As the ratchet plates 111A, 111B rotate in the web take-up direction, the pawl 112 is drawn away from the portion 38A of the frame 38, and when the frame engaging surface 116 of the pawl 112 has cleared the portion 38A of the frame 38 the biasing member 120 acts against the groove or channel 118 to rotate the pawl 112 about the pin 115 and thereby force the tooth 114 of the pawl 112 into engagement with the toothed wheel 102. Continued rotation of the ratchet plates 111A, 111B causes the tooth 114 of the pawl 112 to become trapped between adjacent teeth, T2, of the toothed wheel 102. Illustratively, the teeth, T2, of the toothed wheel 102 are shaped and oriented relative to the toothed wheel 102 such that the tooth 114 of the pawl engages the toothed wheel 102 adjacent to a flat side of one of the teeth, T2, and further rotation of the ratchet plates 111A, 111B rotates the toothed wheel 102 in the web take-up direction. As the toothed wheel 102 rotates in the web take-up direction, so too does the spool 44 and the ratchet wheels 46A, 46B, thereby increasing the tension on the restraint web 20. As the ratchet wheels 46A, 46B rotate in the web take-up direction the locking bar 48 rides along the curved side of the next tooth, T1, until it eventually drops down the flat side of that tooth, T1, thereby trapping the locking bar 48 between that tooth, T1, and the frame 42 to lock the spool 44 in this new position in which an additional, incremental amount of the restraint web 20 has been taken up on the spool 44 of the retractor 40.

Continued rotation of the ratchet wheels 111A, 111B causes the locking bar 48 to advance along the ratchet wheels 46A, 46B in the web take-up direction and successively lock against sequentially different ones of the teeth, T1, until the web ratcheting lever 28 reaches a fully actuated position. As the web ratcheting lever 28 is returned to its rest position, the locking bar 48 remains locked against one of the teeth, T1, to prevent rotation of the spool 44 in the web pay-out direction, while movement of the cable wire 72A toward the ratcheting device 45 causes ratchet plates 111A, 111B to rotate in the web pay-out direction relative to the frame 42 while the tooth 114 rides over the curved portions of the teeth, T2, of the toothed wheel 102.

Repeated actuation of the web ratcheting lever 28 between its rest position and its fully actuated position thus results in incremental drawing, or ratcheting, of the web onto the spool 44 of the web retractor 40. Movement of the web ratcheting lever 28 is also transferred via the cable wire 74A to the ratcheting device 55 mounted to the web retractor 50 as just described with respect to the web retractor 40, and in this manner the web ratcheting lever 28 may be actuated between its rest and fully actuated positions to cause each of the ratcheting devices 45, 55 to move in a direction that moves the two (or more) restraint webs 20, 24 in their web take-up direction, and if the free ends of the restraint web 20 and/or 24 is/are secured to a structure, to apply tension to, and/or increases tension applied to, the restraint web 20 and/or 24.

Referring now to FIGS. 8-10, various details of the web ratcheting actuator 70 are shown. In the illustrated embodiment, for example, the web ratcheting actuator 70 includes a mounting plate 76, and the ends 72D, 74D of the cable sheaths 72B, 74D are mounted to a portion 73 thereof as described above. The lever web ratcheting lever 28 defines a manually actuatable handle 28A that steps down to a planar portion 28B adjacent to the handle 28A and a rear portion 28C in the form of an upstanding wall which is illustratively generally parallel with the stepped portion between the handle 28A and the planar portion 28B. A cover plate 78 extends over the planar portion 28B of the lever 28 between the rear portion 28C and the stepped portion defined between the handle 28A and the planar portion 28B (cover plate 78 shown in FIG. 8 but omitted in FIGS. 9 and 10 to illustrate components internal to the actuator 70). In the illustrated embodiment, the cover plate 78 is affixed to the lever 28, e.g., via welding, although in other embodiments the cover plate 78 may be removably attachable to the lever 28. In any case, a space is defined between the cover plate 78 and the planar portion 28B of the lever 28, and a clutch 90 is positioned within this space and movably mounted to the lever 28 as will be described in detail below.

The mounting plate 76, planar portion 28B of the lever 28, cover plate 78 and clutch 90 each defined bores therethrough that align in assembly and receive a shaft 79, e.g., a threaded bolt, therethrough. A spacer 134 is positioned between the cover plate 78 and the clutch 90, and an identical spacer (not shown) is positioned between the planar portion 28B of the lever 28 and the clutch 90, and the shaft 79 is received through each of these spacers during assembly to maintain clearance between the clutch 90 and the planar portion 28B of the lever and between the clutch 90 and the cover plate 78. The shaft 79 is capped, e.g., by a head of the shaft 79, adjacent to an outer surface of the cover plate 78, and also adjacent to an outer surface of the mounting plate 76, e.g., by a bolt threaded onto the shaft 79. The lever 28 and cover plate 78 are thus rotatable about the shaft 79 relative to the cover plate. The clutch 90 is normally rotatable with the lever 28 and cover plate 78 about the shaft 79, and under some conditions, which will be described in detail below, the clutch 90 is rotatable about the shaft 79 relative to the combination of the lever 28 and the cover plate 78. The actuator 70 further includes a pair of posts 75A, 75B mounted to and extending from an inner surface of the mounting plate 76 adjacent to lower edges of the planar portion 28B of the lever 28, the cover plate 78 and the clutch 90. The post 75B is positioned relative to the mounting plate 76 and the clutch 90 to define a stop, and thereby an at rest position, of the lever 28 when the lower edge of the clutch 90 contacts the post 75B, as illustrated in FIG. 8. The post 75A, in contrast, is positioned relative to the mounting plate 76 and the planar portion 28B of the lever 28 and the cover plate 78 to define another stop, and thereby a fully actuated position, of the lever 28 when the lower edges of the planar portion 28B of the lever 28 and the cover plate 78 contact the post 75A, as illustrated in FIG. 9. The lever 28 is generally movable, e.g., pivotable, about the shaft 79 between the at rest and fully actuated positions defined by the posts 75B and 75A respectively.

The clutch 90 is illustratively implemented in the form of a planar body 92, e.g., a rigid plate, and a generally arcuate channel 94 is defined through the clutch body 92 between the handle 28A and the shaft 79 extending therethrough. Another shaft 135, separate from the shaft 79, extends through the slot 94, and is affixed at one end to the planar portion 28B of the lever 28 and at an opposite end to the cover plate 78. A spacer 136 is positioned between the cover plate 78 and the channel 94, and an identical spacer (not shown) is positioned between the planar portion 28B of the lever 28 and the channel 94, and the shaft 135 is received through each of these spacers during assembly. Yet another spacer 144 is positioned on the shaft 135 between the foregoing spacers, as illustrated in FIG. 10, and the spacer 144 rides along an edge of the channel 94. One edge of the channel 94, e.g., an inner edge, defines a protrusion 146 between the two ends of the channel 94, and the protrusion 144 extends inwardly into the channel 94 as illustrated in FIG. 10.

The rear portion 28C of the lever 28 defines a pair of bores 28D, 28E therethrough which are each sized to receive therein and therethrough free ends of a different one of a corresponding elongated guide member 96, 98 respectively. The opposite end of the elongated guide member 96 is affixed to the spacer (not shown) positioned on the shaft 79 between the planar portion 28B of the lever 28 and the clutch body 92, and the opposite end of the elongated guide member 98 is affixed to the spacer 134. An elongated coil spring 130 is received on and over the elongated guide member 96 and extends between the inner surface of the rear portion 28C of the lever 28 over the bore 28D and the spacer (not shown) positioned on the shaft 79 between the planar portion 28B of the lever 28 and the clutch body 92, and another elongated coil spring 132 is received on and over the elongated guide member 98 and extends between the inner surface of the rear portion 28C of the lever 28 over the bore 28E and the spacer 134. It will be understood that although FIGS. 8-10 illustrated two elongated guide members 96, 98 and associated elongated coil springs 130, 132, alternate embodiments may be implemented with more or fewer such guide members and associated springs.

A force distribution device 138 is mounted to the clutch body 92, e.g., between the handle 28A and the channel 94 defined through the clutch body 92. The force distribution device 138 is coupled to each of the cable wires 72A, 74A and acts to distribute the moving force applied by the lever 28, when moved between the at rest and fully actuated positions, substantially equally to each of the two (or more) ratcheting devices 45, 55. In the illustrated embodiment, for example, in which the cable wires 72A, 74B form a single cable wire, the force distribution device 138 is implemented in the form of a single pulley wheel rotatably mounted to the clutch body 92 via a mounting shaft 140, e.g., a nut and bolt combination, such that the pulley wheel is rotatable in either direction about the mounting shaft 140. The single cable wire 72A, 74A extends about and engages the pulley wheel 138, as illustrated in FIG. 9. The pulley wheel 138 automatically rotates relative to the clutch body 92 as needed to distribute the moving force applied by the lever 28 to the two (or more) ratcheting devices 45, 55 via the cable wire 72A, 74A substantially equally to each of the ratcheting devices 45, 55 as the lever 28 is moved between its at rest and fully actuated positions. Those skilled in the art will recognize that the apparatus 12 may include additional pulley wheels for distributing substantially equally the moving force between ratcheting devices in embodiments that include more than two such ratcheting devices, and/or may include or more alternate conventional force distribution devices for distributing substantially equally the moving force between any number of ratcheting devices.

In any case, the clutch 90 is illustratively movable with the lever 28 and the cover plate 78 relative to the mounting plate 76 as the combination of the lever 28, cover plate 78 and clutch 90 is moved between the at rest and fully actuated positions of the lever 28 as long as the force applied by such movement to the cable wires 72A, 74A is less than a threshold force. This is accomplished by selecting the size and shape of the protrusion 146 and the biasing force of the elongated coil springs 130, 132 to maintain the shaft 135 and spacer 144 below the protrusion 146 as the lever 28 is actuated between its at rest and fully actuated positions, as illustrated in FIG. 9. Under such conditions, the elongated coil springs 130, 132 each exert a biasing force between the rear portion 28C of the lever 28 and the clutch body 92 such that the free ends of the elongated guide members 96, 98 extend only slightly beyond the outer surface of the rear portion 28C of the lever 28 as illustrated in FIG. 8.

The size and shape of the protrusion 146 and the biasing force of the elongated spring coils 130, 132 are further selected such that, when the force applied by movement of the lever 28 between its at rest and fully actuated position to the cable wires 72A, 74A is greater than or equal to the threshold force, the clutch body 92 allows the lever 28 and the cover plate 78 to move relative thereto such that the clutch body 92 remains stationary while the lever 28 moves between its at rest and fully actuated positions as illustrated in FIG. 10. In particular, as the force applied by movement of the lever 28 to the cable wires 72A, 74A increases, so too does the upward force of the spacer 144 against the protrusion 146 which is translated rearwardly against the biasing force of the elongated coil springs 130, 132. As the force applied by movement of the lever 28 to the cable wires 72A, 74A reaches the threshold force, the upward force of the spacer 144 against the protrusion 146 applies a forward force on the lever assembly (including the lever 28, cover plate 78, shaft 135 and spacer 144) relative to the clutch body 92 which overcomes the biasing force of the elongated coil springs 130, 132 and thereby forcing the lever assembly forward relative to the clutch body 92. As the lever assembly moves forward, the rear portion 28C of the lever 28 to moves forward relative to the elongated guide members 96, 98 such that the guide members 96, 98 extend further through the bores 28D, 28E respectively. This forward movement of the lever assembly relative to the clutch body 92 allows the spacer 144 to pass over the protrusion 146 into an upper portion of the channel 94 of the clutch body 92 as illustrated in FIG. 10.

The clutch 90 thus maintains the force applied by movement of the lever 28 to the cable wires 72A, 74A below the threshold force. In one embodiment, the threshold force is selected to be a force below which the cable wires 72A, 74A and/or the ratcheting devices 45, 55 and/or web retractors 40, 50 can be safely operated and above which the cable wires 72A, 74A and/or the ratcheting devices 45, 55 and/or web retractors 40, 50 may be damaged. Those skilled in the art will recognize that the threshold force may be selected according to one or more additional or alternate criteria, and such one or more additional or alternate criteria is/are contemplated by this disclosure. Those skilled in the art will further recognize that the concepts described herein relating to the clutch 90 may alternatively by implemented in systems including only a single retractor, and/or to systems including more than two retractors.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. An apparatus for ratcheting multiple restraint webs, comprising:
   a first web retractor coupled to one end of a first restraint web, the first web retractor including a first locking device which, when engaged with the first web retractor, prevents movement of the first restraint web in a web pay-out direction relative to the first web retractor,
   a second web retractor coupled to one end of a second restraint web, the second web retractor including a second locking device which, when engaged with the second web retractor, prevents movement of the second restraint web in a web pay-out direction relative to the second web retractor,
   a first ratcheting device coupled to the first web retractor, the first ratcheting device movable in a direction that moves the first web in a web take-up direction, opposite to the web pay-out direction of the first web, relative to the first web retractor when the first locking device is engaged with the first web retractor,
   a second ratcheting device coupled to the second web retractor, the second ratcheting device movable in a direction that moves the second web in a web take-up direction of the second web, opposite to the web pay-out direction, relative to the second web retractor when the second locking device is engaged with the second web retractor, and
   a first actuator movable between first and second positions and coupled to each of the first and second ratcheting devices, the first and second ratcheting devices each responsive to a moving force applied thereto by the first actuator, as the first actuator moves from the first position toward the second position thereof, to move in the direction that moves the first and second restraint webs respectively in its web take-up direction.

2. The apparatus of claim 1 further comprising a force distribution device coupled to the first actuator and to each of the first and second ratcheting devices, the force distribution device distributing the moving force applied by the first actuator substantially equally to each of the first and second ratcheting devices as the first actuator is moved from the first position toward the second position.

3. The apparatus of claim 2 further comprising a cable having one end coupled to the first ratcheting device and an opposite end coupled to the second ratcheting device,
wherein the force distribution device comprises a pulley wheel rotatably mounted to the first actuator, first cable extending about and engaging the pulley wheel between the one end and the opposite end of the cable, the pulley wheel rotating relative to the first actuator to distribute the moving force applied by the first actuator to the first and second ratcheting devices via the cable substantially equally to each of the first and second ratcheting devices as the first actuator is moved from the first position toward the second position.

4. The apparatus of claim 1 wherein the first actuator comprises:
a first mounting plate,
a first lever coupled to and movable relative to the first mounting plate between the first and second positions of the first actuator, and
a clutch coupled to and between the first lever and each of the first and second ratcheting devices, the clutch movable with the first lever as the first lever moves between the first and second positions thereof relative to the first mounting plate when the moving force applied to the first and second ratcheting devices by movement of the first lever between the first and second positions thereof does not exceed a threshold force, the clutch allowing the first lever to move relative to the clutch such that the clutch remains stationary relative to the first and second ratcheting devices as the first lever moves between the first and second positions thereof when the moving force applied to the first and second ratcheting devices by movement of the first lever relative to the first mounting plate exceeds the threshold force.

5. The apparatus of claim 4 wherein a force distribution device is mounted to the clutch, the clutch coupled to each of the first and second ratcheting devices via the force distribution device.

6. The apparatus of claim 4 wherein the clutch comprises a planar body defining a first bore therethrough,
and wherein the first lever comprises a planar portion and a handle extending away from the planar portion, the planar portion defining a second bore therethrough,
and wherein the first actuator further comprises a first shaft extending through the first and second bores and rotatably mounted to the first mounting plate such that the clutch and the first lever rotate about the first shaft relative to the first mounting plate as the first lever is moved between the first and second positions thereof when the moving force applied to the first and second ratcheting devices by movement of the first lever between the first and second positions thereof does not exceed the threshold force.

7. The apparatus of claim 6 wherein the clutch defines a generally arcuate slot extending through the planar body and spaced apart from the first bore,
and wherein the first actuator further comprises a second shaft extending through the slot and having one end affixed to the planar portion of the first lever between the handle and the first shaft.

8. The apparatus of claim 7 wherein the generally arcuate slot defines a protrusion along one wall thereof that separates the slot into a first section on one side of the protrusion and a second section on an opposite side of the protrusion, the protrusion sized to permit passage of the second shaft from the first section of the slot to the second section of the slot and thereby allow the first lever to move relative to the clutch when the moving force applied to the first and second ratcheting devices by movement of the first lever relative to the first mounting plate exceeds the threshold force, and to otherwise prevent passage from the first section of the slot to the second section of the slot.

9. The apparatus of claim 8 wherein the first lever further comprises a rear portion extending from the planar portion with the planar portion positioned between the handle and the rear portion, the rear portion defining at least one bore therethrough, and wherein the first actuator further comprises:
at least one elongated guide member affixed at one end to the first shaft and having an opposite end slidably received through the at least one bore defined through the rear portion of the first lever, and
at least one elongated spring slidably received on the at least one elongated guide member and extending between the first shaft and the rear portion of the first lever, the at least one elongated spring having a spring force selected to bias the opposite end of the at least one elongated guide member toward the at least one bore defined through the rear portion of the first lever when the moving force applied to the first and second ratcheting devices by movement of the first lever between the first and second positions thereof does not exceed the threshold force, and to permit the at least one elongated guide member to travel through the at least one bore defined through the rear portion of the first lever to allow movement of the planar portion of the first lever relative to the clutch in order to accommodate passage of the second shaft over the protrusion from the first section of the slot to the second section of the slot when the moving force applied to the first and second ratcheting devices by movement of the first lever relative to the first mounting plate exceeds the threshold force.

10. The apparatus of claim 1 further comprising:
a retractor unlocking apparatus, and
a second actuator including a second lever movable between first and second positions and coupled to the retractor unlocking apparatus, the retractor unlocking apparatus disengaging the first locking device from the first web retractor and disengaging the second locking device from the second web retractor as the second lever is moved from the first position toward the second position thereof such that the first and second restraint webs are thereafter movable relative to the first and second web retractors respectively in their respective web pay-out directions.

11. The apparatus of claim 1 wherein the first web retractor comprises:
a first frame,
a first axle rotatably mounted to the first frame, the first axle rotatable relative to the first frame about a first axis defined by the first axle,
a first spool mounted on and rotatable with the first axle about the first axis, the one end of the first restraint web attached to the first spool, and
at least a first ratchet wheel mounted to the first spool and rotatable with the first spool about the first axis, the at least the first ratchet wheel comprising a first plurality of teeth about a perimeter thereof, wherein the first locking device comprises a first locking bar movably mounted to the first frame adjacent to the at least the first ratchet wheel, and wherein each of the first plurality of teeth is oriented relative to the at least the first ratchet wheel such that the first locking bar is trapped in a first locked position between the first frame and one of the first plurality of teeth when the first locking device is engaged with the first web retractor to thereby prevent movement of the first spool in the web pay-out direction of the first web relative to the first web retractor while allowing movement of the first spool in a web take-up direction opposite to the web pay-out direction of the first web, and wherein the second web retractor comprises:

a second frame, a second axle rotatably mounted to the second frame, the second axle rotatable relative to the second frame about a second axis defined by the second axle, a second spool mounted on and rotatable with the second axle about the second axis, the one end of the second restraint web attached to the second spool, and at least a second ratchet wheel mounted to the second spool and rotatable with the second spool about the second axis, the at least the second ratchet wheel comprising a second plurality of teeth about a perimeter thereof, wherein the second locking device comprises a second locking bar movably mounted to the second frame adjacent to the at least the second ratchet wheel, and wherein each of the second plurality of teeth is oriented relative to the at least the second ratchet wheel such that the second locking bar is trapped in a second locked position between the second frame and one of the second plurality of teeth when the second locking device is engaged with the second web retractor to thereby prevent movement of the second spool in the web pay-out direction of the second web relative to the second web retractor while allowing movement of the second spool in a web take-up direction opposite to the web pay-out direction of the second web.

12. The apparatus of claim 11 wherein the first web retractor further comprises a first biasing member attached to and between the first frame and the first locking bar, the first biasing member normally biasing the first locking bar into the first locked position, and wherein the second web retractor further comprises a second biasing member attached to and between the second frame and the second locking bar, the second biasing member normally biasing the second locking bar into the second locked position.

13. The apparatus of claim 11 further comprising:

a retractor unlocking apparatus, and a second actuator including a second lever movable between first and second positions and coupled to the retractor unlocking apparatus, the retractor unlocking apparatus disengaging the first locking device from the first web retractor and disengaging the second locking device from the second web retractor as the second lever is moved from the first position toward the second position thereof such that the first and second restraint webs are thereafter movable relative to the first and second web retractors respectively in their respective web pay-out directions, wherein the retractor unlocking apparatus comprises:

a first unlocking bar that moves the first locking bar, relative to the first frame, away from and out of contact with the first plurality of teeth to a first unlocked position relative to the first frame as the second lever is moved from the first position toward the second position thereof, and a second unlocking bar that moves the second locking bar, relative to the second frame, away from and out of contact with the second plurality of teeth to a second unlocked position relative to the second frame as the second lever is moved from the first position toward the second position thereof, such that each of the first and second restraint webs is thereafter movable relative to the respective one of the first and second web retractors in its web pay-out direction.

14. The apparatus of claim 11 wherein the first ratcheting device comprises:

a third ratchet wheel mounted on and rotatable with the first axle about the first axis, the third ratchet wheel comprising a third plurality of teeth about a perimeter thereof, and a first pawl coupled to the first actuator, the first pawl responsive to the moving force applied thereto by the first actuator as the first actuator moves from the first position toward the second position thereof to engage one of the third plurality of teeth and rotate the third ratchet wheel in a web take-up direction, wherein the first locking bar becomes successively trapped between the first frame and different ones of the first plurality of teeth on the at least the first ratchet wheel as the first spool rotates on the first axle with the third ratchet wheel in the web take-up direction to thereby shorten a length of the first restraint web between the first spool and an opposite end of the first restraint web, and wherein the second ratcheting device comprises:

a fourth ratchet wheel mounted on and rotatable with the second axle about the second axis, the fourth ratchet wheel comprising a fourth plurality of teeth about a perimeter thereof, and a second pawl coupled to the first actuator, the second pawl responsive to the moving force applied thereto by the first actuator as the first actuator moves from the first position toward the second position thereof to engage one of the fourth plurality of teeth and rotate the fourth ratchet wheel in a web take-up direction, wherein the second locking bar becomes successively trapped between the second frame and different ones of the second plurality of teeth on the at least the second ratchet wheel as the second spool rotates on the second axle with the fourth ratchet wheel in the web take-up direction to thereby shorten a length of the second restraint web between the second spool and an opposite end of the second restraint web.

15. The apparatus of claim 14 wherein the first ratcheting device further comprises a first ratchet plate coupled to the first actuator and rotatably mounted on the first axle, the first ratchet plate rotatable relative to the first frame and relative to the first axle, the first pawl mounted to the first ratchet plate such that the first ratchet plate and the first pawl are together responsive to the moving force applied to the first ratchet plate by the first actuator as the first actuator moves from the first position toward the second position thereof to rotate relative to the first frame and relative to the first axle in the web take-up direction, and wherein the second ratcheting device further comprises a second ratchet plate coupled to the first actuator and rotatably mounted on the second axle, the second ratchet plate rotatable relative to the second frame and relative to the second axle, the second pawl mounted to the second ratchet plate such that the second ratchet plate and the second pawl are together responsive to the moving force applied to the second ratchet plate by the first actuator as the first actuator moves from the first position toward the second position thereof to rotate relative to the second frame and relative to the second axle in the web take-up direction.

16. The apparatus of claim 15 further comprising a first cable having one end coupled to the first ratchet plate and an opposite end coupled to the second ratchet plate, a portion of the first cable between the first and second ratchet plates coupled to the first actuator, wherein the moving force applied by the first actuator as the first actuator moves from the first position toward the second position is transferred by the first cable to each of the first and second ratchet plates to rotate the first ratchet plate in the web take-up direction and to also rotate the second ratchet plate in the web take-up direction.

17. The apparatus of claim 16 further comprising:

a retractor unlocking apparatus, a second actuator including a second lever movable between first and second positions and coupled to the retractor unlocking apparatus, the retractor unlocking apparatus disengaging the first locking device from the first web retractor and disengaging the second locking device from the second web retractor as the second lever is moved from the first position toward the second position thereof such that the first and second restraint webs are thereafter movable relative to the first and second web retractors respectively in their respective web pay-out directions, and a second cable having one end coupled to the second lever and an opposite end coupled to the retractor unlocking apparatus, the second cable transferring a moving force applied to the retractor unlocking apparatus by movement of the second lever from the first position toward the second position thereof.

18. The apparatus of claim 10 wherein the first and second web retractors, the first and second ratcheting devices and the retractor unlocking apparatus are mounted within and carried by a housing having one or more mounting brackets configured to mount the housing to one or more corresponding legs of a bulkhead carried by a motor vehicle.

* * * * *